United States Patent [19]  [11] 4,309,712
Iwakura  [45] Jan. 5, 1982

[54] THERMAL PRINTER
[75] Inventor: Sadao Iwakura, Kawasaki, Japan
[73] Assignee: Canon Kabushiki Kaisha, Tokyo, Japan
[21] Appl. No.: 105,788
[22] Filed: Dec. 20, 1979
[30] Foreign Application Priority Data
Dec. 27, 1978 [JP] Japan .................. 53-165874
[51] Int. Cl.³ ............................................ G01D 15/10
[52] U.S. Cl. ............................. 346/76 PH; 307/265
[58] Field of Search .............. 346/76 PH; 219/216; 400/120; 307/265, 266, 234; 328/58

[56] References Cited
U.S. PATENT DOCUMENTS 3,725,672 4/1973 Reuter ........................... 307/265 X
4,021,741 5/1977 Collins ......................... 307/234 X
4,070,587 1/1978 Hanakata ..................... 346/76 R X
4,216,481 8/1980 Hakoyama ................... 346/76 PH
4,219,824 8/1980 Asai ............................. 346/76 PH
4,246,587 1/1981 Reilly ........................... 346/76 PH

FOREIGN PATENT DOCUMENTS 52-33544 3/1977 Japan ........................... 346/76 PH
54-126553 10/1979 Japan ................................ 400/120

Primary Examiner—Joseph W. Hartary
Attorney, Agent, or Firm—Fitzpatrick, Cella, Harper & Scinto

[57] ABSTRACT

A thermal printer includes a memory for storing recording information supplied to a thermal printing head, and control circuitry for comparing the recording information stored in the memory with new recording information supplied subsequently to the previous recording information to the thermal printing head to control drive time time of the head for the new recording information in accordance with an outcome of the comparison.

4 Claims, 2 Drawing Figures

THERMAL PRINTER

BACKGROUND OF THE INVENTION

1. Field of the Invention

The present invention relates to a thermal printer capable of controlling the drive time of a thermal head.

2. Description of the Prior Art

In a conventional thermal printer equipped with a thermal head having a 5×7 or 1×7 heat-generating dot-element array for character recording of a dot matrix structure, a continuous recording with signals of a determined duration supplied to the heat-generating dot elements may result in a gradual increase in head temperature as successive recording is initiated before the head face is sufficiently cooled, thus leading to an uneven recording or to a head temperature higher than its maximum permissible value, thus causing the destruction of the head. On the other hand the recording speed will have to be sacrificed if a sufficient cooling time is given between the recording signals.

SUMMARY OF THE INVENTION

An object of the present invention is to provide a thermal printer in which the dot information to be recorded is retained and detected by a record time control circuit to control the record time of the output dots thereby preventing the destruction of the thermal head by heat and providing a uniform recording density.

Another object of the present invention is to provide a control apparatus comprising memory means for storing drive information supplied to a member driven intermittently, comparator means for comparing the drive information stored in the memory means with new drive information supplied subsequently to the previous drive information to the intermittently driven member and for providing the outcome of the comparison, and control means for controlling the drive time of the intermittently driven member according to the outcome of comparison supplied by the comparator means.

Still another object of the present invention is to provide a thermal printer comprising memory means for storing recording information supplied to a thermal printing head, and control means for comparing the recording information stored in the memory means with the new recording information supplied subsequently to the previous recording information to the thermal printing head and for controlling the drive time of the thermal printing head according to the outcome of the comparison.

DESCRIPTION OF THE PREFERRED EMBODIMENT

Figure 1:
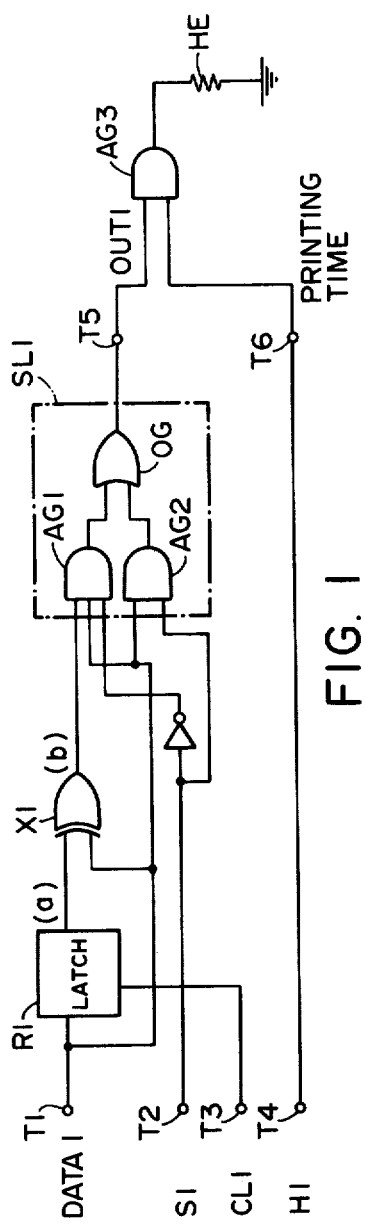
FIG. 1 is a schematic block diagram showing an embodiment of circuitry for the thermal printer in accordance with the present invention.

Referring to FIG. 1 showing printing time control circuitry for controlling one of the heat-generating elements of a thermal head to be used in a thermal printer, dot information DATA1 is supplied to a terminal T1 while a select signal S1 is supplied to a terminal T2 for determining the duration of printing time. Also a latch clock signal CL1 is supplied to a terminal T3, and a printing time signal H1 is supplied to a terminal T4.

A latch circuit R1 stores dot information in response to the latch clock signal CL1 supplied from the terminal T3. A comparator circuit X1 is composed of an exclusive OR gate for identifying if the dot information stored in the latch circuit R1 is identical with the succeeding dot information supplied to the terminal T1.

A selector SL1 is composed of AND gates AG1, AG2 and an OR gate OG. The signal from the terminal T1 is supplied to AND gates AG1 and AG2, and the select signal S1 from the terminal T2 is supplied directly to the AND gate AG2 and also through an inverter I to the AND gate AG1, which also receives the output of the comparator circuit X1.

The output of AND gate AG1, AG2 is supplied to a terminal T5 through the OR gate OG.

The output signal OUT1 from terminal T5 is guided through an AND gate AG3, which is to be enabled by the printing time signal H1 from an output terminal T6, to activate a heating element HE thereby recording the dot information on recording paper.

Figure 2:
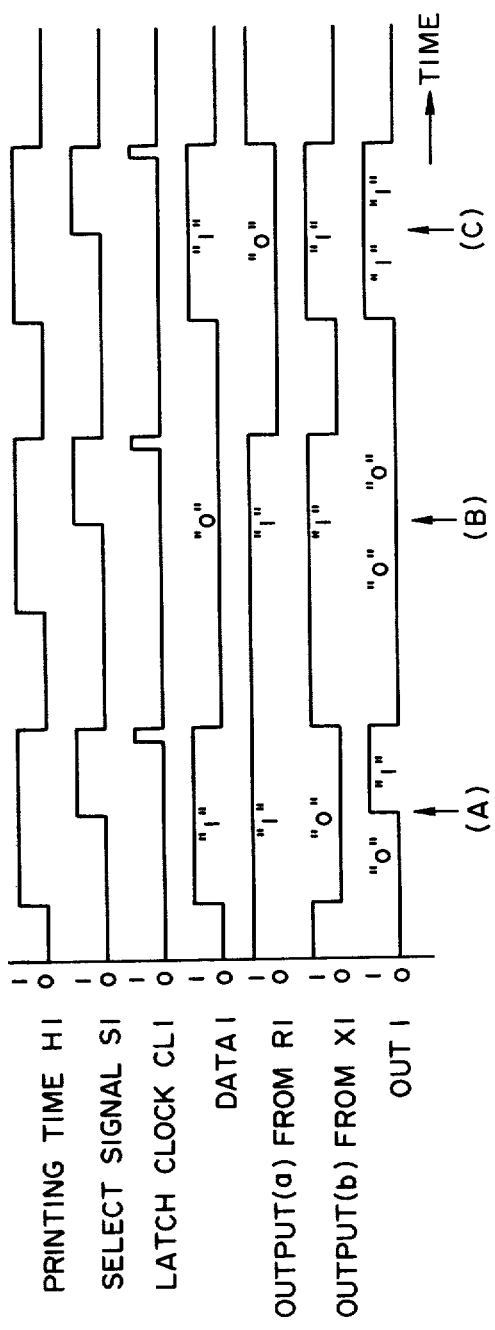
FIG. 2 shows signal waveforms appearing in the circuitry shown in FIG. 1.

In the following, the printing time control circuitry of the present invention will be further clarified by an embodiment thereof shown in FIG. 1 and also by a timing chart of FIG. 2 representing the operations of the circuitry.

In FIG. 2, the section A represents a case wherein the latch circuit R1 retains preceding dot information, and succeeding dot information is supplied to the terminal T1. As shown in the section A, the comparator circuit X1 provides an output (b) equal to "0" when the output (a) of the latch circuit R1 and the signal DATA1 are both "1", and output (b) "0" is supplied as the output signal OUT1 when the select signal S1 is "0". Also the dot information DATA1 equal to "1" is supplied to the output terminal T5 when the select signal S1 is "1". Consequently the heating element is activated only when the select signal S1 is equal to "1".

The section B in FIG. 2 represents a situation wherein the latch circuit retains the preceding dot information while the terminal T1 does not receive the succeeding dot information DATA1, namely when the output (a) of the latch circuit R1 is equal to "1" while the dot information is equal to "0". In such a case the output OUT1 remains at "0" regardless of the state of the select signal S1 as the signal DATA1 supplied to the selector SL1 remains at "0". Consequently, the heating element HE is not energized regardless of whether the select signal S1 is equal to "0" or "1".

Finally the section C in FIG. 2 represents a condition wherein the latch circuit R1 does not retain the preceding dot information while the terminal T1 receives the succeeding dot information, namely the output (a) of the latch circuit R1 is equal to "0" while the signal DATA1 is equal to "1". In this case the output (b) of the comparator circuit X1 is supplied to the terminal T5 when the select signal S1 is equal to "0", and the dot information DATA1 equal to "1" is supplied to the terminal T5 when the select signal S1 equal to "1". As the result, the heating element HE is activated regardless of whether the select signal S1 is equal to "1" or "0". Upon completion of each printing, the dot information DATA1 is entered into the latch circuit R1 by the latch clock signal CL1. As a result it is rendered possible to reduce the printing time in consideration of the temperature rise of the thermal head in the presence of the preceding dot information or to adopt the normal printing time in the absence of the preceding dot information. As discussed in the foregoing, the printing time control circuitry of the present invention regulates the printing time of the dot information by holding and detecting the same, thus to achieve a constant temperature rise of the thermal head thereby preventing the destruction of the head and obtaining a uniform printing density. The control circuit allows the control of individual dot even in a multiple-dot combination. Besides a wider range of control of the printing time is possible by employing plural latch circuits R1 for dividing the select signal S1.

Although in the foregoing embodiment the comparison is made only with the immediately preceding information, it is also possible to utilize the further preceding information for the drive control by employing a series of latch circuits of which outputs are supplied to an AND gate giving an output signal to the comparator circuit.

What I claim is:

1. A thermal printer having:

memory means for storing a recording information pattern supplied to a thermal head; and control means coupled to said memory means for comparing the recording information pattern stored in said memory means with a new recording information pattern to be supplied subsequently to the previous recording information pattern to said thermal head, and controlling drive time of said thermal head for the new recording information pattern according to an outcome of said comparison to reduce the drive time of said thermal head in case the new recording information pattern coincides with the recording information pattern stored in said memory means.

2. A thermal printer having a thermal head comprising a plurality of dot elements to form a recording information such as characters, numerals, symbols, and so on, wherein each dot element of said thermal head is activated to perform a recording operation on a recording medium upon receipt of a recording signal, and to refrain from performing the recording operation upon receipt of a non-recording signal, characterized by control signal generating means (E.G. SL1) for producing a first signal having a predetermined time interval in response to the recording signal subsequent to the non-recording signal, and producing a second signal having a time interval less than that of the first signal in response to a new recording signal subsequent to the previous recording signal; and control means (E.G. AG3) coupled to said control signal generating means for controlling a driving time interval of the dot element of said thermal head in accordance with the first signal and the second signal from said signal generating means.

3. A thermal printer according to claim 2 wherein said signal generating means includes storage means for storing the recording signal or the non-recording signal.

4. A thermal printer according to claim 3 wherein said signal generating means further includes comparison means for comparing the recording signal or the non-recording signal stored in said storage means with the successive new recording signal or non-recording signal.

* * * * *